(12) United States Patent
Nakamura

(10) Patent No.: US 6,606,678 B1
(45) Date of Patent: Aug. 12, 2003

(54) COMPUTER SYSTEM

(75) Inventor: Nobutaka Nakamura, Hidaka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 433 days.

(21) Appl. No.: 09/605,399

(22) Filed: Jun. 28, 2000

(30) Foreign Application Priority Data

Jun. 29, 1999 (JP) .......................................... 11-183919

(51) Int. Cl.⁷ .............................................. G06F 13/14
(52) U.S. Cl. ...................................... 710/305; 710/306
(58) Field of Search ................................ 710/305, 306, 710/311, 312, 313, 314, 300, 301, 302, 303, 304

(56) References Cited

U.S. PATENT DOCUMENTS

| 4,837,677 A | * | 6/1989 | Burrus et al. ............... 710/308 |
| 5,457,785 A | | 10/1995 | Kikinis et al. |
| 5,564,026 A | * | 10/1996 | Amini et al. ............... 710/315 |
| 5,579,489 A | | 11/1996 | Dornier et al. |
| 5,619,659 A | | 4/1997 | Kikinis et al. |
| 5,633,631 A | * | 5/1997 | Teckman ..................... 341/58 |
| 5,696,949 A | | 12/1997 | Young |
| 5,734,846 A | | 3/1998 | Robertson |
| 5,751,975 A | * | 5/1998 | Gillespie et al. ............ 710/315 |
| 5,764,924 A | | 6/1998 | Hong |
| 5,781,747 A | | 7/1998 | Smith et al. |
| 5,822,571 A | | 10/1998 | Goodrum et al. |
| 6,003,105 A | | 12/1999 | Vicard et al. |
| 6,070,214 A | | 5/2000 | Ahern |
| 6,088,752 A | | 7/2000 | Ahern |
| 6,425,033 B1 | * | 7/2002 | Conway et al. ............. 710/107 |
| 6,457,091 B1 | * | 9/2002 | Lange et al. ............... 710/314 |

FOREIGN PATENT DOCUMENTS

| EP | 0881778 A2 | * 12/1998 |
| JP | 10-161974 | 6/1998 |

* cited by examiner

Primary Examiner—Sumati Lefkowitz
Assistant Examiner—X. Chung-Trans
(74) Attorney, Agent, or Firm—Finnegan, Henderson, Farabow, Garrett & Dunner, L.L.P.

(57) ABSTRACT

In this invention, the bus of a computer body is connected to the bus of an expansion unit through a serial interface so as to implement connection wirings in the form of a serial cable. A PCI-PCI bridge for connecting a primary PCI bus to a secondary PCI bus comprises two physically isolated controllers, i.e., a primary PCI serial transfer controller implemented on the PC body side and a secondary PCI serial transfer controller implemented on the docking station side. The two controllers are connected to each other through serial LVDS lines. Transactions are exchanged between the primary PCI bus and the secondary PCI bus by serial transfer between the primary PCI serial transfer controller and the secondary PCI serial transfer controller.

17 Claims, 7 Drawing Sheets

| OUT | IN1 | IN2 |
|---|---|---|
| +V | "1" | "1" |
| ZERO | "0" | "1" |
| −V | "0" | "0" |
FIG. 6
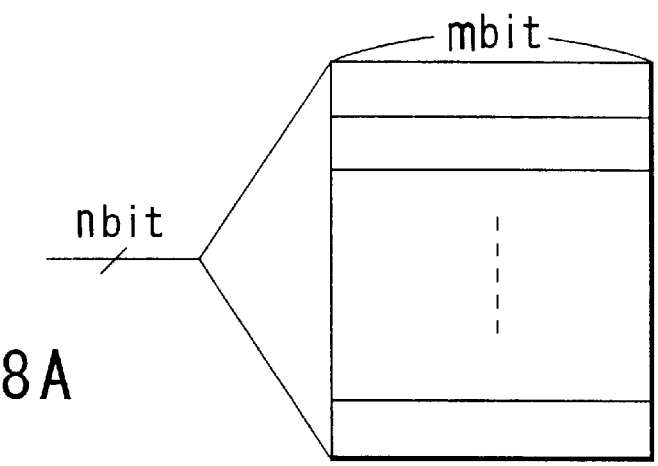
FIG. 8A
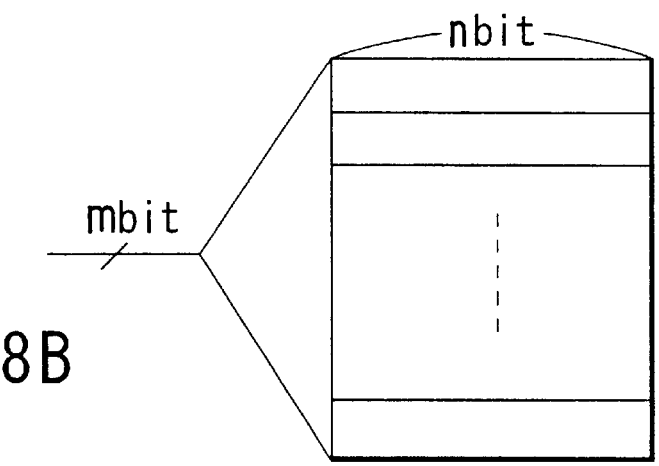
FIG. 8B

COMPUTER SYSTEM

CROSS-REFERENCE TO RELATED APPLICATIONS

This application is based upon and claims the benefit of priority from the prior Japanese Patent Application No. 11-183919, filed Jun. 29, 1999, the entire contents of which are incorporated herein by reference.

BACKGROUND OF THE INVENTION

The present invention relates to a computer system and, more particularly, to a computer system which is improved to connect two buses to each other through a serial transmission path.

Recently, various portable, battery-driven, notebook type personal computers (to be referred to as notebook PCs hereinafter) have been developed. Some notebook PCs are designed to be attached to expansion units to expand the functions as needed. To allow a notebook PC body to effectively use the resources of an expansion unit, it is important to connect the bus of the notebook PC body to the bus in the expansion unit. With this bus connection, devices on the bus in the expansion unit can be handled in the same manner as devices in the notebook PC body.

In many personal computers, PCI (Peripheral Component Interface) buses are used. Bus connection between a notebook PC body and an expansion unit is generally performed by physically connecting PCI buses on the notebook PC body side to expansion unit side through docking connectors, each having many pins corresponding to the number of signal lines of each PCI bus, prepared on the notebook PC body side and expansion unit side.

According to this arrangement, however, a physically large area is required to mount a docking connector. This causes a disadvantage in attaining reductions in the size and profile of the notebook PC body. In addition, the connector mounting position on the notebook PC body side needs to match that on the expansion unit side. This imposes limitations on a physical housing structure in production development.

A technique of connecting a PC body to an expansion unit through a cable by using a standard parallel port of the PC body is disclosed in U.S. Pat. Nos. 5,457,785, 5,579,489, and 5,619,659. According to this technique, an ISA (Industry Standard Architecture) bus is formed in the expansion unit connected to the PC body through the cable via the standard parallel port of the PC body, and the ISA bus in the expansion unit is operated in the same manner as the ISA bus in the PC body by using a circuit for translating the signal state of the ISA bus in the PC body.

U.S. Pat. No. 5,822,571 also discloses an arrangement in which a PCI bus is extended from a PC body to another housing by connecting a PCI bus on the primary side to a PCI bus on the secondary side through a flat cable, and a clock synchronization method of coping with a transmission delay in a cable.

According to these conventional cable connection methods, however, since data are transferred in parallel through a cable, the cable is provided with many signal lines. For this reason, the following problems arise:

1) The cable becomes thick, difficult to handle, and expensive.
2) The number of pins of connectors for cable connection increases, and hence the cost of each connector increases. This also interferes with a reduction in size.

In general, a PCI-PCI bridge is used to connect a plurality of PCI buses on a system board. The PCI-PCI bridge is an LSI for bidirectionally connecting a primary PCI bus to a secondary PCI bus. This bridge allows a device on the primary PCI bus to access a device on the secondary PCI bus, and vice versa. Such PCI-PCI bridges may be provided at two ends of a cable to connect the PCI bus of the notebook PC body to the PCI bus in the expansion unit. In this arrangement, however, the cable portion also serves as a PCI bus (to which an individual bus number is assigned) according to the PCI specifications, and hence a total of three PCI buses must be managed from the viewpoint of software. Since no PCI device is connected to the cable connecting the notebook PC body to the expansion unit, assigning a bus number to the cable leads to wasting resources. In addition, this becomes a factor that complicates resource management by software.

BRIEF SUMMARY OF THE INVENTION

The present invention has been made in consideration of the above situation, and has as its object to provide a computer system which can connect a computer body to an expansion unit through a cable with a smaller number of signal lines, realizes a new bus connection scheme that prevents resources from being wastefully assigned to the cable, and is excellent in function expandability and flexibility of the housing structure.

In order to achieve the above object, a computer system of the present invention is characterized by comprising first and second buses respectively constituted by multiple-bit-width parallel transmission paths; a first controller connected to the first bus; a second controller connected to the second bus; and a serial transmission path interposed between the first and second controllers; wherein the first and second controllers exchange a command, address, and data of a transaction from one of the first and second buses to the other bus by serial transfer through the serial transmission path, and the first and second controllers logically constitute one unit.

In this computer system, the bridge unit for connecting the first and second buses to each other is divided into two physically isolated controllers, and two controllers are connected to each other through a serial transmission path. A command, address, and data required for transfer of a transaction between the buses are exchanged between two controllers by serial transfer through this serial transmission path. This allows a transaction on one bus to be reproduced on the other bus. If, therefore, two controllers are separately provided in a computer body in which the first bus is provided and an expansion unit in which the second bus is provided, and a serial transmission path between these controllers is implemented by a cable, the computer body can be connected to the expansion unit through a cable with a smaller number of signal lines. In addition, the first and second controllers logically constitute one single bridge unit. Therefore, the serial transmission path is just a local internal wiring inside the bridge unit and is not recognized by software. This means that no unnecessary resource is assigned to the serial transmission path.

Furthermore, since the logically single controller is physically divided into two controllers, special design is required more or less. Many of configuration registers in which operation environments are to be set are preferably implemented in two controllers, and identical pieces of environmental setting information are preferably set in these registers. If configuration registers are implemented in only one of two controllers, the other controller must read the configuration registers in one controller through the serial transmission path whenever the information stored in these registers becomes necessary. This causes degradation in system performance. If configuration registers are separately implemented in two controllers, as needed, each controller can operate in accordance with the environmental setting information set in the corresponding configuration registers. This makes it possible to perform high-speed operation.

Since serial transfer through the serial transmission path requires a clock signal faster than a bus clock signal, a means for improving noise resistance is required. For this reason, a differential signal line pair in which a transformer is inserted is preferably used as a serial transmission path. With the insertion of the transformer, transfer for the DC components of a signal can be prevented, and hence noise resistance to common mode noise such as static electricity can be improved.

If a differential signal line pair in which a transformer is inserted is to be used, it is important to ensure a satisfactory DC balance with respect to a transmission signal in consideration of the characteristics of the transformer. This is because magnetic saturation or excitation of the transformer and a shift in the offset level of a signal on the secondary side of the transformer must be prevented. For this reason, serial transfer is preferably performed by using a scheme of converting each binary data constituting serial data into ternary data including the first state in which a current flows in the transformer in a positive direction, the second state in which a current flows in the transformer in a negative direction, and the third state in which no current flows in the transformer, and transmitting the ternary data. For example, a satisfactory DC balance can be ensured by, for example, control operation of outputting ternary data upon alternately switching the first and second states every time the value of binary data changes, and outputting data with the third state when the value of binary data remains unchanged. For another example, the satisfactory DC balance can also be ensured by control operation of outputting data with the third state when the value of binary data is "0", and outputting data while alternately switching the first and third states when the value of binary data is "1".

An nBmB scheme of transmitting information required for transaction transfer by encoding the information into m-bit (m>n) code sequences in units of n-bit information words can be used instead of using the above ternary scheme. A satisfactory DC balance can be ensured by converting information words into code sequences with ratios for the numbers of "1s" to the numbers of "0s" are equal, and transmitting the code sequences.

Each of the first and second controllers preferably comprises bus interface means which operates in synchronous with the same first clock signal as that used by a device on a corresponding one of the first and second buses so as to exchange a transaction with the corresponding bus, and serial transfer means which operates in synchronous with a second clock signal asynchronous to the first clock signal so as to execute serial transfer through the serial transmission path.

Since the first clock signal is a bus clock signal, its frequency needs to be set to a standard value determined by bus specifications. In addition, a bus clock signal may be stopped for power saving control. By operating the bus interface means and serial transfer means asynchronously, serial transfer performance can be arbitrarily determined without being influenced by the frequency of the first clock signal, the state of the bus, and the like.

The bus interface means of the first and second controllers are preferably operated asynchronously. By setting asynchronous clock signals at two ends of the serial transmission path in this manner, accurate transaction transfer can be performed regardless of the transmission delay due to serial transfer.

The serial transmission path is characterized by comprising a full duplex channel including at least one pair of unidirectional serial transmission paths whose signal transmission directions are opposite to each other, and each of the unidirectional serial transmission paths includes a serial data line for serially transferring of the command, address, and data, and a clock signal line for transferring a corresponding clock signal. With this arrangement, a full duplex channel can be realized by using a serial transmission path. In addition, sufficiently high-speed serial transfer can be realized by providing a clock signal line independently of a serial data line as compared with the case wherein clock information is embedded in data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view for explaining the relationship between input and output values in the serial transfer scheme in FIG. 5;

FIGS. 8A and 8B are views for explaining the principle of an nBmB encoder/decoder used in the serial transfer scheme in FIG. 7.

DETAILED DESCRIPTION OF THE INVENTION

An embodiment of the present invention will be described below with reference to the views of the accompanying drawing.

Figure 1:
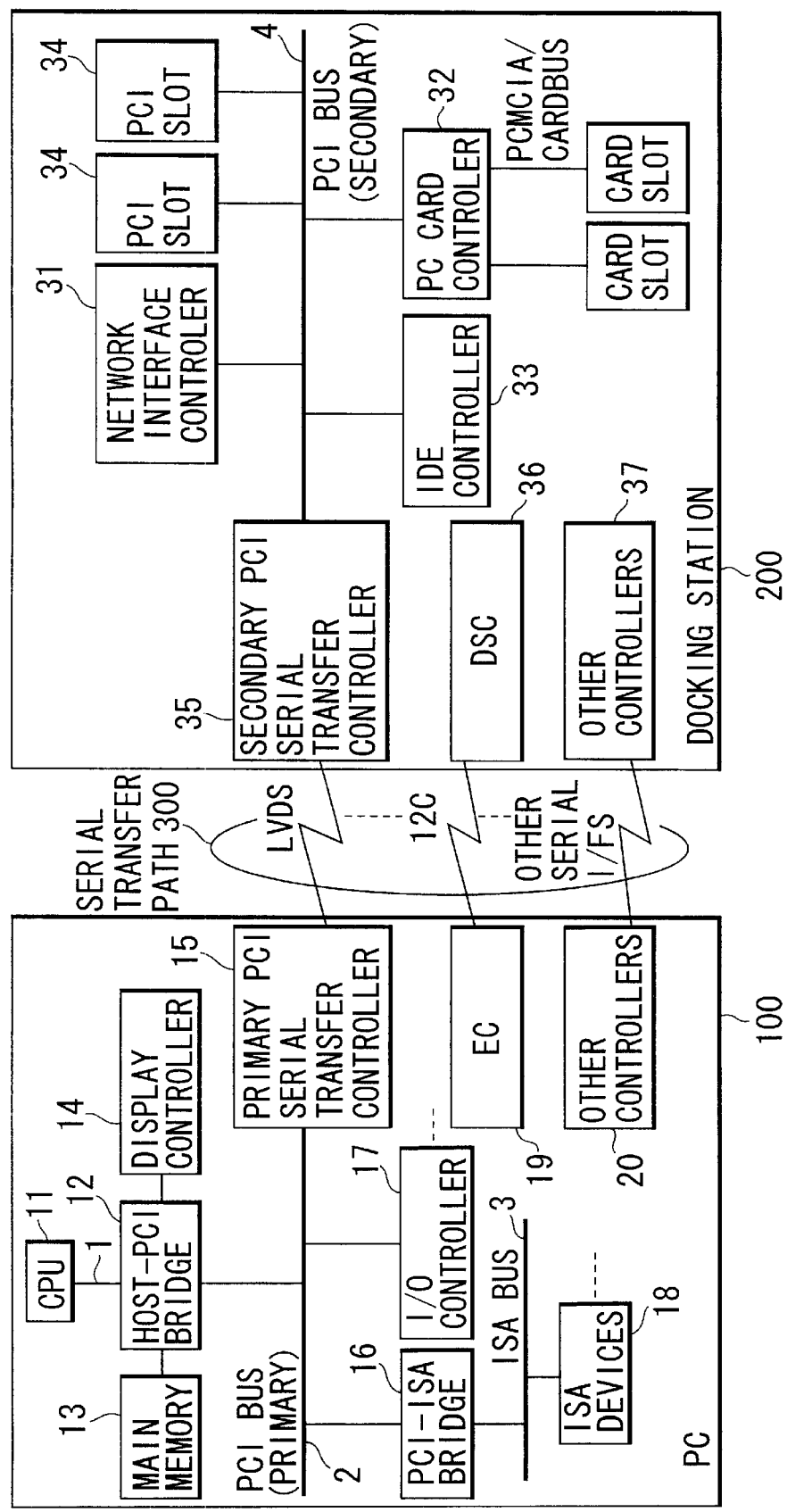
FIG. 1 is a block diagram showing the arrangement of a computer system according to an embodiment of the present invention.

FIG. 1 shows the arrangement of a computer system according to an embodiment of the present invention. This computer system is a notebook type personal computer (PC) and comprises a PC body 100 and a docking station 200 for function expansion, which can be used after it is connected to the PC body 100 through a cable. The signal lines in the cable constitute a serial transfer path 300, as shown in FIG. 1. The serial transfer path 300 is constituted by an LVDS (Low Voltage Differential Signaling) line, I²C (Inter Integrated Circuit) bus, and other serial control signal lines.

The LVDS line is a serial transmission path that is used to serially connect a PCI bus 2 in the PC body 100 to a PCI bus 4 in the docking station 200. Bus transactions are exchanged between the PCI bus 2 in the PC body 100 and the PCI bus 4 in the docking station 200 by high-speed bit serial signal transfer through this serial transmission path.

As shown in FIG. 1, the PC body 100 comprises a processor bus 1, PCI bus 2, ISA bus 3, CPU 11, host-PCI bridge 12, main memory 13, display controller 14, primary PCI serial transfer controller 15, PCI-ISA bridge 16, I/O controllers 17, various ISA devices 18, EC (Embedded Controller) 19, various other controllers 20, and the like.

The CPU 11 controls the overall operation of this PC system and executes the operating system, system BIOS, and various other programs loaded into the main memory 13. The host-PCI bridge 12 is a bridge unit for bidirectionally connecting the processor bus 1 to the primary PCI bus 2. The host-PCI bridge 12 incorporates a memory control logic for access control on the main memory 13 and a control logic for an AGP (Accelerated Graphics Port) that is used for connection to the display controller 14. The host-PCI bridge 12 can function as a bus master on the primary PCI bus 2. The main memory 13 stores, for example, the operating system, application programs/utility programs to be processed, and user data generated by application programs and the like.

The primary PCI serial transfer controller 15 logically forms one PCI-PCI bridge unit in cooperation with a secondary PCI serial transfer controller 35 implemented in the docking station 200. This PCI-PCI bridge unit serves to bidirectionally connect the PCI bus 2 in the PC body 100 to the PCI bus 4 in the docking station 200. The PCI-PCI bridge unit allows a device on the PCI bus 2 to access a device on the PCI bus 4, and vice versa. The PCI bus 2, which is closer to the host side from the viewpoint of the PCI-PCI bridge unit, serves as the primary PCI bus of the PCI-PCI bridge unit, whereas the PCI bus 4, which is farther from the host side, serves as the secondary PCI bus of the PCI-PCI bridge unit. In this embodiment, therefore, the PCI-PCI bridge unit that connects the primary PCI bus 2 to the secondary PCI bus 4 is divided into two physically isolated controllers (the primary PCI serial transfer controller 15 and secondary PCI serial transfer controller 35), and two controllers are connected to each other through LVDS lines, thereby realizing a PCI serial interface.

The PCI-ISA bridge 16 is a bridge for connecting the PCI bus 2 to the ISA bus 3. Various ISA devices 18 are connected to the ISA bus 3. The I/O controllers 17 are devices functioning as bus masters or targets on the PCI bus 2. Devices such as a PC card controller, IDE (Integrated Drive Electronics) controller, and sound controller are connected as the I/O controllers 17 to the PCI bus 2.

The EC (Embedded Controller) 19 controls the power management of the PC body 100 and also controls a docking/undocking sequence for the docking station 200 by communicating with a DSC (Docking Station Controller) 36 implemented in the docking station 200.

As shown in FIG. 1, the docking station 200 incorporates the PCI bus 4, a network interface controller 31, a PC card controller 32, an IDE controller 33, PCI slots 34, the secondary PCI serial transfer controller 35, the DSC (Docking Station Controller) 36, other controllers 37, and the like.

The network interface controller 31 performs communication control for connection to a LAN, and serves as a bus master or target on the PCI bus 4. The PC card controller 32 controls a PC card complying with the PCMCIA (Personal, Computer Memory Card International Association)/CardBus specifications and inserted into a PC card slot. The PC card controller 32 also serves as a bus master or target on the PCI bus 4. The IDE controller 33 controls IDE devices such as a hard disk drive and CD-ROM drive installed in the docking station 200, and serves as a bus master or target on the PCI bus 4. Various PCI expansion cards can be inserted into the PCI slots 34.

Figure 2:
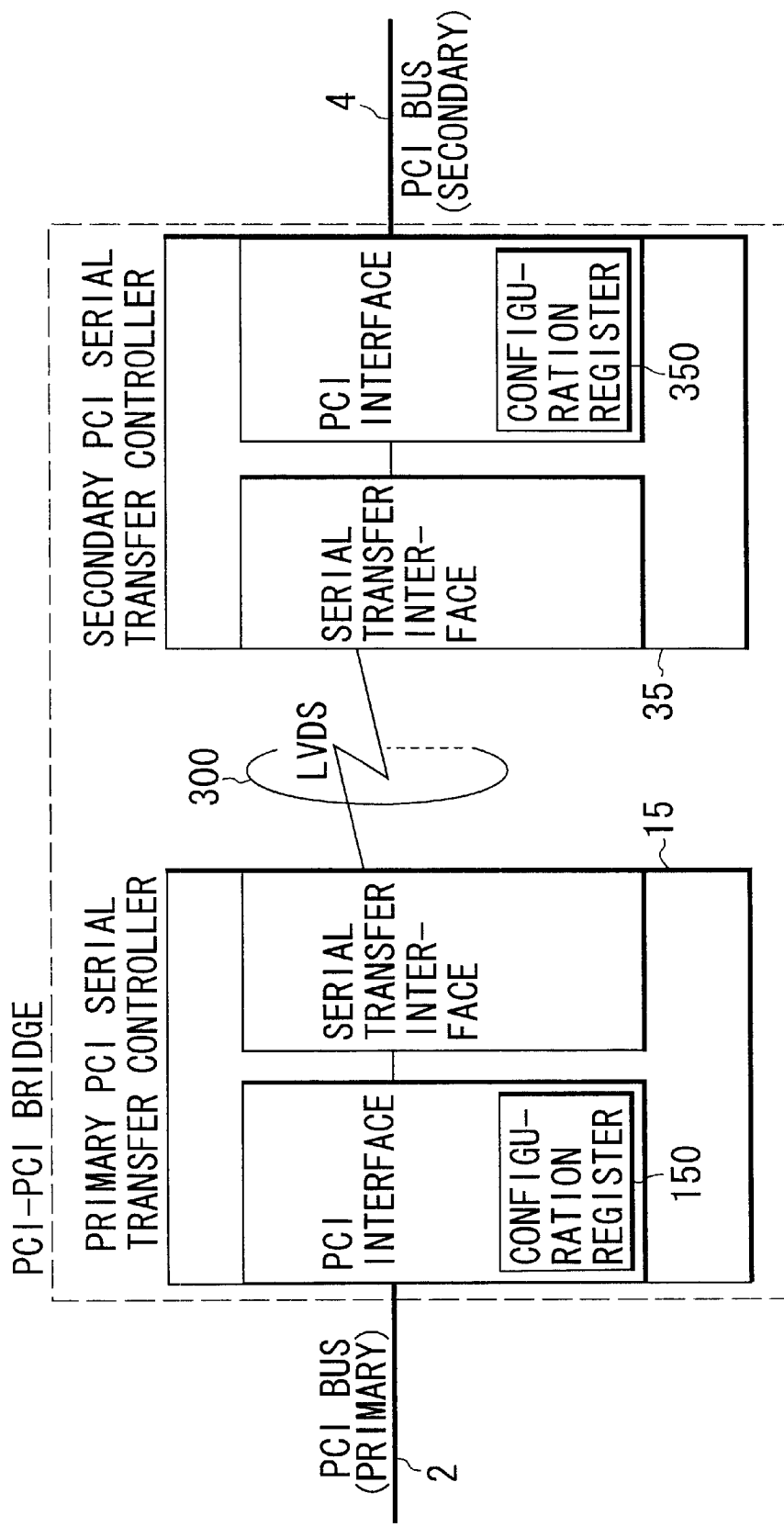
FIG. 2 is a block diagram showing the arrangement of a PCI-PCI bridge used in this embodiment.

When the PC body 100 is connected to the docking station 200, these PCI devices such as the network interface controller 31, PC card controller 32, IDE controller 33, and PCI expansion cards of PCI slots 34 can be used as hardware resources in the PC body 100. PCI-PCI Bridge FIG. 2 shows the functional arrangements of the primary PCI serial transfer controller 15 and secondary PCI serial transfer controller 35.

As described above, although the primary PCI serial transfer controller 15 and secondary PCI serial transfer controller 35 are physically independent LSIs, they function as one PCI-PCI bridge logically. For this reason, the LVDS line connecting the primary PCI serial transfer controller 15 to the secondary PCI serial transfer controller 35 is just a local internal wiring inside the PCI-PCI bridge and is not recognized by software. This means that no unnecessary resource is assigned to the serial transmission path. Since the primary PCI serial transfer controller 15 and secondary PCI serial transfer controller 35 share the configuration address space assigned by one IDSEL signal, they are recognized as one device by software. Since two controllers, i.e., the primary PCI serial transfer controller 15 and secondary PCI serial transfer controller 35, are recognized as one device, only the primary PCI serial transfer controller 15 may have device identification information.

Each of the primary PCI serial transfer controller 15 and secondary PCI serial transfer controller 35 is constituted by a PCI interface section and serial transfer interface section.

In the primary PCI serial transfer controller 15, the PCI interface section exchanges bus transactions with the primary PCI bus 2. In the secondary PCI serial transfer controller 35, the PCI interface section exchanges bus transactions with the secondary PCI bus 4. The PCI interface sections exchange transactions with each other by serial data transfer between serial transfer interface sections respectively implemented in the primary PCI serial transfer controller 15 and the secondary PCI serial transfer controller 35.

A PCI bus is a parallel transmission path including address/data lines having a width of a plurality of bits, and the like. A bus transaction on the PCI bus is basically constituted by an address phase for outputting a command and address, and one or more data transfer phases following the address phase. If, therefore, the respective PCI interface sections exchange commands, addresses, and data between the corresponding PCI buses by serial transfer between the respective serial transfer interface sections, transactions can be transferred from the primary PCI bus 2 to the secondary PCI bus 4, and vice versa.

When a transaction from a bus master on the primary PCI bus 2 to a device on the secondary PCI bus 4 takes place, the primary PCI serial transfer controller 15 becomes a target for the transaction being executed on the primary PCI bus 2, and the secondary PCI serial transfer controller 35 becomes an initiator (bus master) for the transaction to be executed on the secondary PCI bus 4. When a transaction from a bus master on the secondary PCI bus 4 to a device on the primary PCI bus 2 takes place, the secondary PCI serial transfer controller 35 becomes a target for the transaction being executed on the secondary PCI bus 4, and the primary PCI serial transfer controller 15 becomes an initiator for the transaction to be executed on the primary PCI bus 2. Note that if no bus master device is present on the secondary PCI bus 4, only the former case holds.

As shown in FIG. 2, configuration registers 150 and 350 are separately implemented in the PCI interface sections of the primary PCI serial transfer controller 15 and secondary PCI serial transfer controller 35. Each of the configuration registers 150 and 350 comprises a register group complying with the PCI specifications. In these registers, identical pieces of environmental setting information are set.

Environmental setting information includes the abovementioned device identification information, device control information for designating hardware resources such as a memory address space and I/O address space which the device is to use, device status information indicating the current state of the device, and the like.

Device identification information is used to identify the type of device, and consists of information such as a device ID, vendor ID, revision ID, header type, and class code. The device identification information is read-only information. Identical pieces of device identification information are written in the configuration registers 150 and 350. Obviously, this read-only device identification information may be prepared in only the primary PCI serial transfer controller 15 closer to the CPU 11, but need not be prepared in the secondary PCI serial transfer controller 35. This is because, in a configuration cycle, the CPU 11 accesses only the primary PCI serial transfer controller 15 and recognizes the existence of a PCI-PCI bridge between the PCI bus 2 and the PCI bus 4 by reading the device identification information from the primary PCI serial transfer controller 15.

A configuration register serves to hold environmental setting information for defining an operation environment for a PCI device. One configuration register is always implemented in each PCI device. Since the primary PCI serial transfer controller 15 and secondary PCI serial transfer controller 35 operate as one PCI device (PCI-PCI bridge), the controllers 15 and 35 can basically share one configuration register, as described above. If, however, a configuration register is implemented in only one controller in this manner, the other controller having no configuration register must read the configuration register in one controller through a serial transmission path for every transaction processing. This may cause degradation in system performance. Since configuration registers are separately implemented in two controllers 15 and 35 as in this embodiment, two controllers 15 and 35 can operate in accordance with the pieces of environmental setting information respectively set in their configuration registers. This makes it possible to realize high-speed operation. In this case, each of two controllers 15 and 35 includes most register groups (a register group for setting device control information, a register group for setting device status information indicating the current state of the device, and the like) except for a register for setting read-only device identification information.

The identity of the contents of the configuration registers 150 and 350 is realized by automatically executing the following copying operation between the primary PCI serial transfer controller 15 and the secondary PCI serial transfer controller 35. When the CPU 11 executes a write transaction (configuration write cycle) to write data in the configuration register 150, copying operation is automatically executed from the configuration register 150 to the configuration register 350. Thereafter, a status indicting the completion of a write is returned to the CPU 11. This makes it possible to always keep the contents of the configuration registers 150 and 350 identical.

Internal Arrangements of Two PCI Serial Transfer Controllers

The internal structures of the primary PCI serial transfer controller 15 and secondary PCI serial transfer controller 35 will be described with reference to FIG. 3, with consideration given to logical protocol hierarchical structures.

Figure 3:
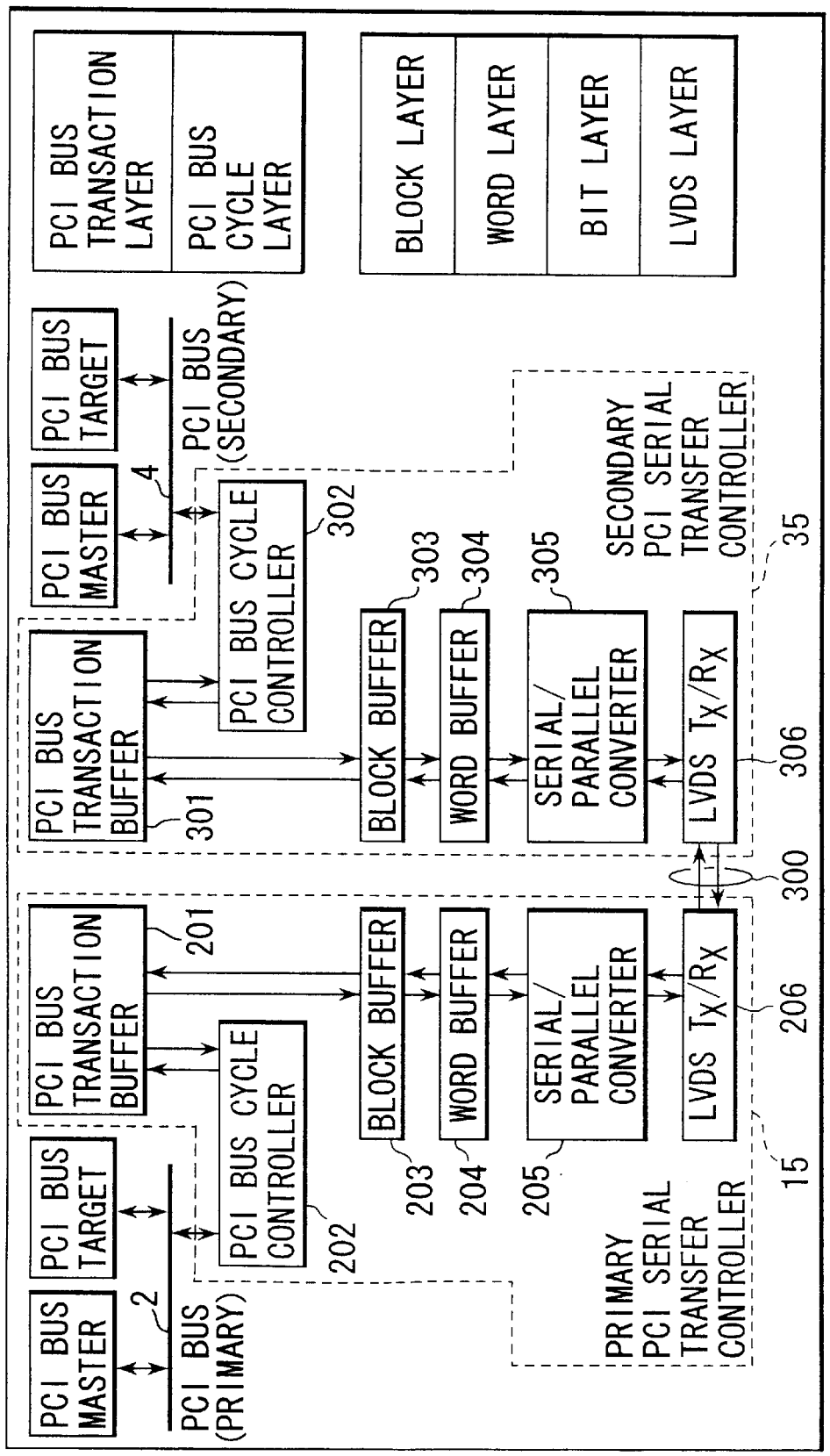
FIG. 3 is a block diagram showing the internal structures of a primary PCI serial transfer controller and secondary PCI serial transfer controller used in this embodiment.

As shown in FIG. 3, the primary PCI serial transfer controller 15 comprises a bus transaction buffer 201, bus cycle controller 202, block transfer buffer 203, word buffer 204, serial/parallel converter 205, and LVDS transmission/reception section 206.

The bus transaction buffer 201 and bus cycle controller 202 correspond to the abovementioned PCI interface section. The block transfer buffer 203, word buffer 204, serial/parallel converter 205, and LVDS transmission/reception section 206 correspond to the abovementioned serial transfer interface section.

Likewise, as shown in FIG. 3, the secondary PCI serial transfer controller 35 comprises a bus transaction buffer 301, bus cycle controller 302, block transfer buffer 303, word buffer 304, serial/parallel converter 305, and LVDS transmission/reception section 306. The bus transaction buffer 301 and bus cycle controller 302 correspond to the abovementioned PCI interface section. The block transfer buffer 303, word buffer 304, serial/parallel converter 305, and LVDS transmission/reception section 306 correspond to the abovementioned serial transfer interface section.

The right end of FIG. 3 shows a protocol hierarchical structure for implementing a PCI serial interface in this embodiment. The top layer is a PCI bus transaction layer, and a PCI bus cycle layer follows, which is used to control a bus cycle required to actually execute a transaction.

The section implemented by integrating the sections above the bus cycle layer, including the left and right halves, i.e., the section implemented by integrating the bus transaction buffers 201 and 301 and bus cycle controllers 202 and 302, corresponds to a general PCI-PCI bridge.

The layers shown on the lower half of FIG. 3 correspond to a section for performing serial communication between the primary PCI serial transfer controller 15 and the secondary PCI serial transfer controller 35.

The layers shown on the upper half are designed in accordance with a PCI bus protocol, whereas the layers shown on the lower half are optimally designed to faithfully send data transferred on the PCI bus to the other party. There is no need to consider what meaning each data of a block to be transferred has on the PCI bus. It suffices if the block is properly assigned transfer characteristics suitable for the meaning which a set of data transferred over the block has on the PCI bus and if these transfer characteristics are implemented. That is, a concept similar to packet communication in the field of communication can be used.

In this regard, "WORD" in FIG. 3 corresponds to a fixed-length packet, and "BLOCK" is a transfer unit including one control word and 0 to 10 data words.

The meaning of each buffer will be described below.

The bus transaction buffers 201 and 301 are buffers for managing a PCI bus cycle as a transaction, and are used to mediate between a PCI bus cycle and block transfer as described later. The following are pieces of information constituting a transaction, although they slightly vary depending on the type of transaction:

address command write data (write transaction)

byte enables completion status read data (read transaction) These pieces of information are held in the bus transaction buffers 201 and 301.

The block transfer buffers (BLOCK) 203 and 303 are temporary information storage devices for transferring variable-length data called blocks altogether between two serial controllers 15 and 35. The block size is variable, as described above. Each block is basically constituted by pieces of information such as an address, data, command, and byte enables, constituting one transaction.

The word buffers (WORD) 204 and 304 are temporary information storage devices for transferring fixed-length data called words one by one between two serial controllers 15 and 35. Words include control and data words. The substantial portion (PCI transaction information: address, command, data, byte enable, and the like) of each block is exchanged as data words, and the remaining portion is exchanged as control words.

The serial/parallel converters 205 and 305 perform parallel/serial conversion and serial/parallel conversion in units of words. The LVDS transmission/reception section 206 and 306 perform actual serial data transfer through LVDS lines.

Hardware Arrangements of Two PCI Serial Transfer Controllers

The detailed hardware arrangements of two PCI serial transfer controllers will be described with reference to FIG. 4.

The LVDS line between two PCI serial transfer controllers and 15 and 35 is constituted by a unidirectional line from the PCI serial transfer controller 15 to the PCI serial transfer controller 35 and a unidirectional line from the PCI serial transfer controller 35 to the PCI serial transfer controller 15, and functions as a full duplex channel as a whole. Each unidirectional line has a differential signal line pair (LV DATA) as data lines for serial transfer of information constituting a transaction, and a differential signal line pair (LV CLK) as clock signal lines for serial transfer of a serial clock signal. With this arrangement, data and clock signals can be concurrently transmitted through different signal lines. This makes it possible to perform serial transfer at a sufficiently high speed as compared with a case wherein clock information is embedded in data.

Since the practical serial bit clock speed has its upper limit, it may be difficult to realize a serial transfer path speed that can satisfactorily accommodate the data transfer speed of a PCI bus. Such a problem can be effectively solved by setting the ratio of the number of data lines of each unidirectional line to the number of clock signal lines to 2:1, and setting the number of data lines of a serial transfer path to two for upward transfer and downward transfer respectively.

The following is another merit that can be obtained by using a plurality of data signal lines. Since the serial transfer path of this embodiment uses a dedicated clock signal line, an overhead signal line that does not directly transfer information exists physically. The physical overhead rate becomes ½ that of a conventional serial bus. If two data signal lines are used for one clock signal line, the overhead rate decreases to ⅓. However, with an increase in the number of data signal lines, it becomes difficult to set the same implementation conditions for a clock signal line circuit and data signal line circuit, and the skew width increases. It is therefore appropriate to set the number of signal lines per one clock line to four or less.

Primary PCI Serial Transfer Controller 15

Figure 4:
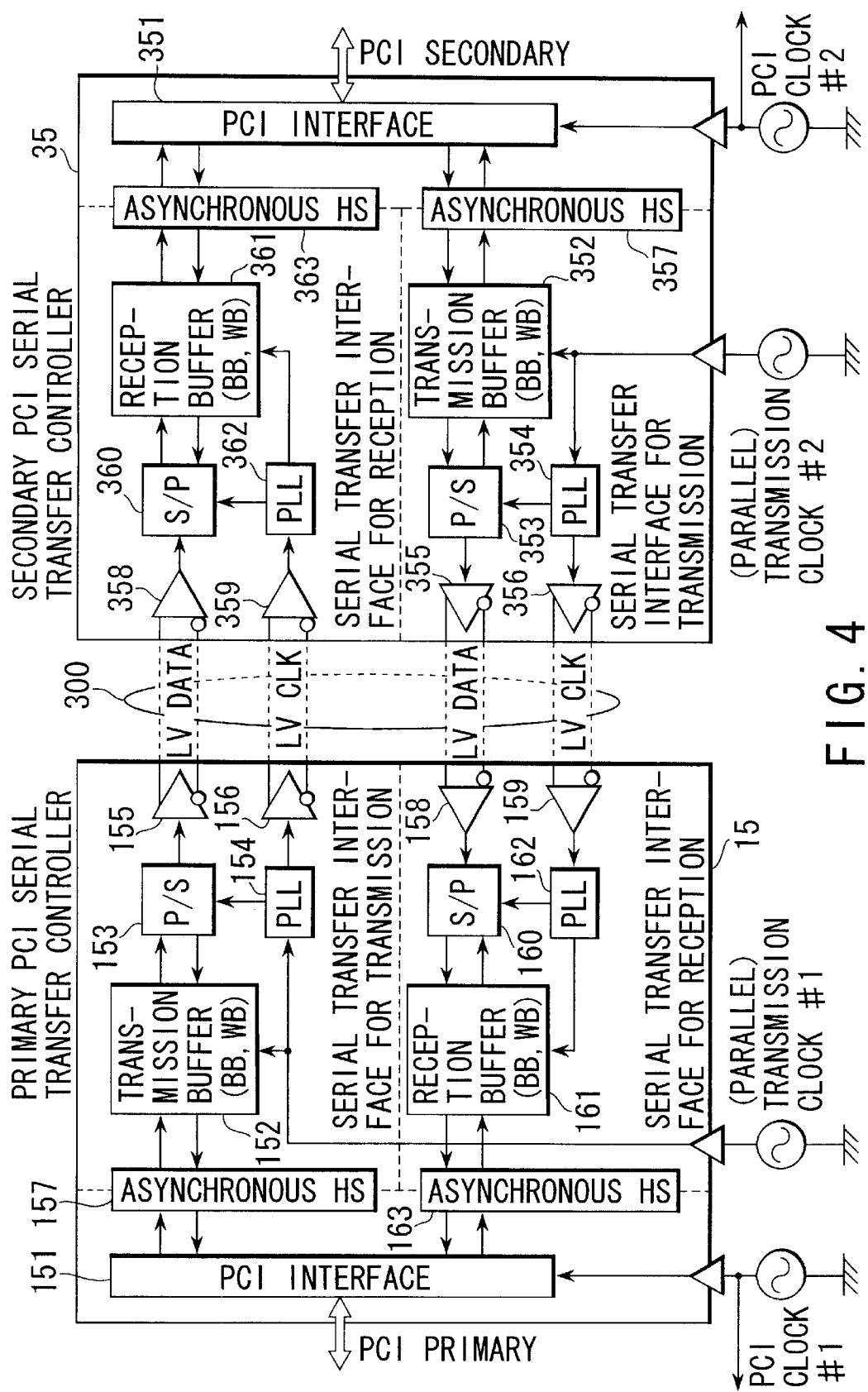
FIG. 4 is a block diagram showing the practical hardware arrangements of the primary PCI serial transfer controller and secondary PCI serial transfer controller used in this embodiment.

As shown in FIG. 4, the primary PCI serial transfer controller 15 comprises a PCI interface section 151, transmission buffer 152, parallel/serial conversion circuit 153, PLL (Phase Locked Loop) circuit 154, differential output buffers 155 and 156, asynchronous handshake circuit 157, differential input buffers 158 and 159, serial/parallel conversion circuit 160, reception buffer 161, PLL circuit 162, and asynchronous handshake circuit 163.

The PCI interface section 151 corresponds to the bus transaction buffer 201 and bus cycle controller 202 described above, and operates in synchronous with PCI clock signal #1 like other PCI devices on the primary PCI bus 2. PCI clock signal #1 is a bus clock signal common to all the PCI devices on the primary PCI bus 2.

The transmission buffer 152, parallel/serial conversion circuit 153, PLL circuit 154, and differential output buffers 155 and 156 function as a serial transfer interface section for transmission. This serial transfer interface section operates in synchronous with parallel transmission clock signal #1 that is asynchronous to PCI clock signal #1.

Two high-speed serial clock signals are obtained from parallel transmission clock signal #1. First serial transmission clock has higher frequency than that of parallel transmission clock signal #1. Second serial transmission clock has the same frequency as parallel transmission clock signal #1. The PLL circuit 154 generates first serial transmission clock by frequency-multiplying parallel transmission clock signal #1. In this embodiment, the PLL circuit 154 multiplies the frequency of parallel transmission clock signal #1 by nine to generate first serial transmission clock. The PLL circuit 154 passes first serial transmission clock to the parallel/serial conversion circuit 153. PLL circuit 154 generates second serial transmission clock by frequency-dividing first serial transmission clock in order to match their phases. In this embodiment, the PLL circuit 154 divides the frequency of first serial transmission clock by nine to generate second serial transmission clock. PLL circuit passes second serial transmission clock to the differential output buffer 156.

The transmission buffer 152 comprises a block transfer buffer (BB) and word buffer (WB) as described above. In this buffer, information for transferring a transaction is stored. The parallel/serial conversion circuit 153 operates in synchronous with first serial transmission clock signal obtained by the PLL circuit 154, converts parallel data prepared in the word buffer (WB) into serial data, and outputs it to the differential output buffer 155. The differential output buffer 155 is a driver for driving a differential signal line pair (LV DATA) for data transmission. This buffer transmits the serial data obtained by the parallel/serial conversion circuit 153 to the secondary PCI serial transfer controller 35 through a differential signal line pair (LV DATA) for data transmission. The differential output buffer 156 is a driver for driving a differential signal line pair (LV CLK) to transmit second serial transmission clock signal. Concurrently with serial data transfer by the differential output buffer 155, the differential output buffer 156 transmits a corresponding second serial transmission clock signal to the secondary PCI serial transfer controller 35 through a differential signal line pair (LV CLK).

As described above, the serial transfer interface section for transmission is designed to operate asynchronously to the PCI interface section 151. The asynchronous handshake circuit 157 interfaces between sections that operate with different clock signals in this manner by handshaking. More specifically, the asynchronous handshake circuits 157 are respectively provided on the bus transaction buffer 201 side of the PCI interface section 151 and the block transfer buffer 203 side in the transmission buffer 152. Upon reception of a transmission request from the bus transaction buffer 201, the asynchronous handshake circuit 157 returns, from the block transfer buffer 203 to the bus transaction buffer 201, a completion notification indicating the completion of storing when the requested transmission is stored in the block transfer buffer 203. The bus transaction buffer 201 does not issue the next transmission request until it receives the completion notification.

The differential input buffers 158 and 159, serial/parallel conversion circuit 160, reception buffer 161, and PLL circuit 162 function as a reception serial interface section. The differential input buffer 158 is a receiver for receiving data from the differential signal line pair (LV DATA). This buffer passes received serial data to the serial/parallel conversion circuit 160. Concurrently with this reception of the serial data by the differential input buffer 158, the differential input buffer 159 receives fourth serial transmission clock signal through the differential signal line pair (LV CLK) for clock transmission, and passes the received fourth serial transmission clock signal to the PLL circuit 162.

The PLL circuit 162 regenerates clock signals (parallel transmission clock signal #2 and third serial transmission clock signal) on secondary PCI serial transfer controller 35 side on the basis of fourth serial transmission clock signal received by the differential input buffer 159. Parallel transmission clock signal #2, third serial transmission clock, and fourth serial transmission clock will be described below. The PLL circuit 162 regenerates third serial transmission clock by frequency-multiplying fourth serial transmission clock. In this embodiment, PLL circuit 162 multiplies the frequency of fourth serial transmission clock by nine to generate third serial transmission clock. The PLL circuit 162 passes third serial transmission clock to the serial/parallel conversion circuit 160. The PLL circuit 162 generates parallel transmission clock signal #2 by frequency-dividing third serial transmission clock. In this embodiment, the PLL circuit 162 divides the frequency of third serial transmission clock by nine to generate parallel transmission clock signal #2. The PLL circuit 162 passes parallel transmission clock signal #2 to the reception buffer 161.

The serial/parallel conversion circuit 160 operates with the regenerated third serial transmission clock signal, converts the serial data received by the differential input buffer 158 into parallel data, and writes it in the reception buffer 161. The reception buffer 161 corresponds to the word buffer (WB) and block transfer buffer (BB) described above, and operates with the regenerated parallel transmission clock signal #2.

Information is asynchronously exchanged between the block transfer buffer of the reception buffer 161 and the bus transaction buffer of the PCI interface section 151 by handshaking through the asynchronous handshake circuit 163.

Secondary PCI Serial Transfer Controller 35

As shown in FIG. 4, the secondary PCI serial transfer controller 35 comprises a PCI interface section 351, transmission buffer 352, parallel/serial conversion circuit 353, PLL circuit 354, differential output buffers 355 and 356, asynchronous handshake circuit 357, differential input buffers 358 and 359, serial/parallel conversion circuit 360, reception buffer 361, PLL circuit 362, and asynchronous handshake circuit 363.

The PCI interface section 351 corresponds to the bus transaction buffer 301 and bus cycle controller 302 as described above, and operates in synchronous with PCI clock signal #2 like other PCI devices on the secondary PCI bus 4. PCI clock signal #2 is a bus clock signal common to all the PCI devices on the secondary PCI bus 4.

In this embodiment, PCI clock signals #1 and #2 are generated by independent clock signal oscillators. PCI clock signals #1 and #2 have the same frequency but are basically asynchronous. Therefore, the PCI interface section 151 of the primary PCI serial transfer controller 15 operates asynchronously to the PCI interface section 351 of the secondary PCI serial transfer controller 35. By using asynchronous PCI clock signals between two controllers 15 and 35 constituting one bridge in this manner, the PCI interface sections on two ends of the serial transmission path can operate asynchronously. This makes it possible to perform accurate transaction transfer regardless of a transmission delay due to serial transfer.

The transmission buffer 352, parallel/serial conversion circuit 353, PLL circuit 354, and differential output buffers 355 and 356 function as a serial transfer interface section for transmission. This serial transfer interface section operates in synchronous with parallel transmission clock signal #2 that is asynchronous to PCI clock signal #2.

Two high-speed serial clock signals are obtained from parallel transmission clock signal #2. Third serial transmission clock has higher frequency than that of parallel transmission clock signal #2. Fourth serial transmission clock has the same frequency as parallel transmission clock signal #2. The PLL circuit 354 generates third serial transmission clock by frequency-multiplying parallel transmission clock signal #2. In this embodiment, the PLL circuit 354 multiplies the frequency of parallel transmission clock signal #2 by nine to generate first serial transmission clock. The PLL circuit 354 passes first serial transmission clock to the parallel/serial conversion circuit 353. The PLL circuit 354 generates fourth serial transmission clock by frequency-dividing third serial transmission clock in order to match their phases. In this embodiment, PLL circuit 354 divides the frequency of third serial transmission clock by nine to generate fourth serial transmission clock. The PLL circuit 354 passes fourth serial transmission clock to the differential output buffer 356. Parallel transmission clock signals #1 and #2 are generated by independent clock signal oscillator. Parallel transmission clock signals #1 and #2 have the same frequency but are basically asynchronous.

The transmission buffer 352 comprises the abovementioned block transfer buffer (BB) and word buffer (WB). In this buffer, information for transferring a transaction is held. The parallel/serial conversion circuit 353 operates in synchronous with the third serial transmission clock signal obtained by the PLL circuit 354, converts parallel data prepared in the word buffer (WB) into serial data, and outputs it to the differential output buffer 355.

The differential output buffer 355 is a driver for driving the differential signal pair (LV DATA) for data transmission. This buffer transmits the serial data obtained by the parallel/serial conversion circuit 353 to the primary PCI serial transfer controller 15 through the differential signal line pair (LV DATA) for data transmission. Concurrently with this serial data transfer by the differential output buffer 355, the differential output buffer 356 transmits a clock signal corresponding to fourth serial transmission clock signal to the primary PCI serial transfer controller 15 through the differential signal line pair (LV CLK).

The asynchronous handshake circuit 357 interfaces between sections that operate with different clock signals in this manner. More specifically, the asynchronous handshake circuits 357 are respectively provided on the bus transaction buffer 301 side of the PCI interface section 351 and the block transfer buffer 303 side in the transmission buffer 352. Upon reception of a transmission request from the bus transaction buffer 301, the asynchronous handshake circuit 357 returns, from the block transfer buffer 303 to the bus transaction buffer 301, a completion notification indicating the completion of storing when the requested transmission is stored in the block transfer buffer 303. The bus transaction buffer 301 does not issue the next transmission request until it receives the completion notification.

The differential input buffers 358 and 359, serial/parallel conversion circuit 360, reception buffer 361, and PLL circuit 362 function as a reception serial interface section. The differential input buffer 358 receives serial data through the differential signal line pair (LV DATA), and passes the received serial data to the serial/parallel conversion circuit 360. Concurrently with this reception of the serial data by the differential input buffer 358, the differential input buffer 359 receives second serial transmission clock signal through the differential signal line pair (LV CLK) for clock transmission, and passes the received second serial transmission clock signal to PLL circuit 362.

The PLL circuit 362 regenerates clock signals (parallel transmission clock signal #1 and first serial transmission clock signal) on primary PCI serial transfer controller 15 side on the basis of second serial transmission clock signal received by the differential input buffer 359. The PLL circuit 362 regenerates first serial transmission clock by frequency-multiplying second serial transmission clock. In this embodiment, the PLL circuit 362 multiplies the frequency of second serial transmission clock by nine to generate first serial transmission clock. The PLL circuit 362 passes first serial transmission clock to serial/parallel conversion circuit 360. The PLL circuit 362 generates parallel transmission clock signal #1 by frequency-dividing first serial transmission clock. In this embodiment, PLL circuit 362 divides the frequency of first serial transmission clock by nine to generate parallel transmission clock signal #1. The PLL circuit 362 passes parallel transmission clock signal #1 to the reception buffer 361.

The serial/parallel conversion circuit 360 operates with the regenerated first serial transmission clock signal, converts the serial data received by the differential input buffer 358 into parallel data, and writes it in the reception buffer 361. The reception buffer 361 corresponds to the abovementioned word buffer (WB) and block transfer buffer (BB), and operates with the regenerated parallel transmission clock signal #1. Information is exchanged between the block transfer buffer of the reception buffer 361 and the bus transaction buffer of the PCI interface section 351 by the asynchronous handshake circuit 363 asynchronously.

Serial Transfer Scheme 1

A practical scheme for serial transfer through an LVDS line will be described.

Figure 5:
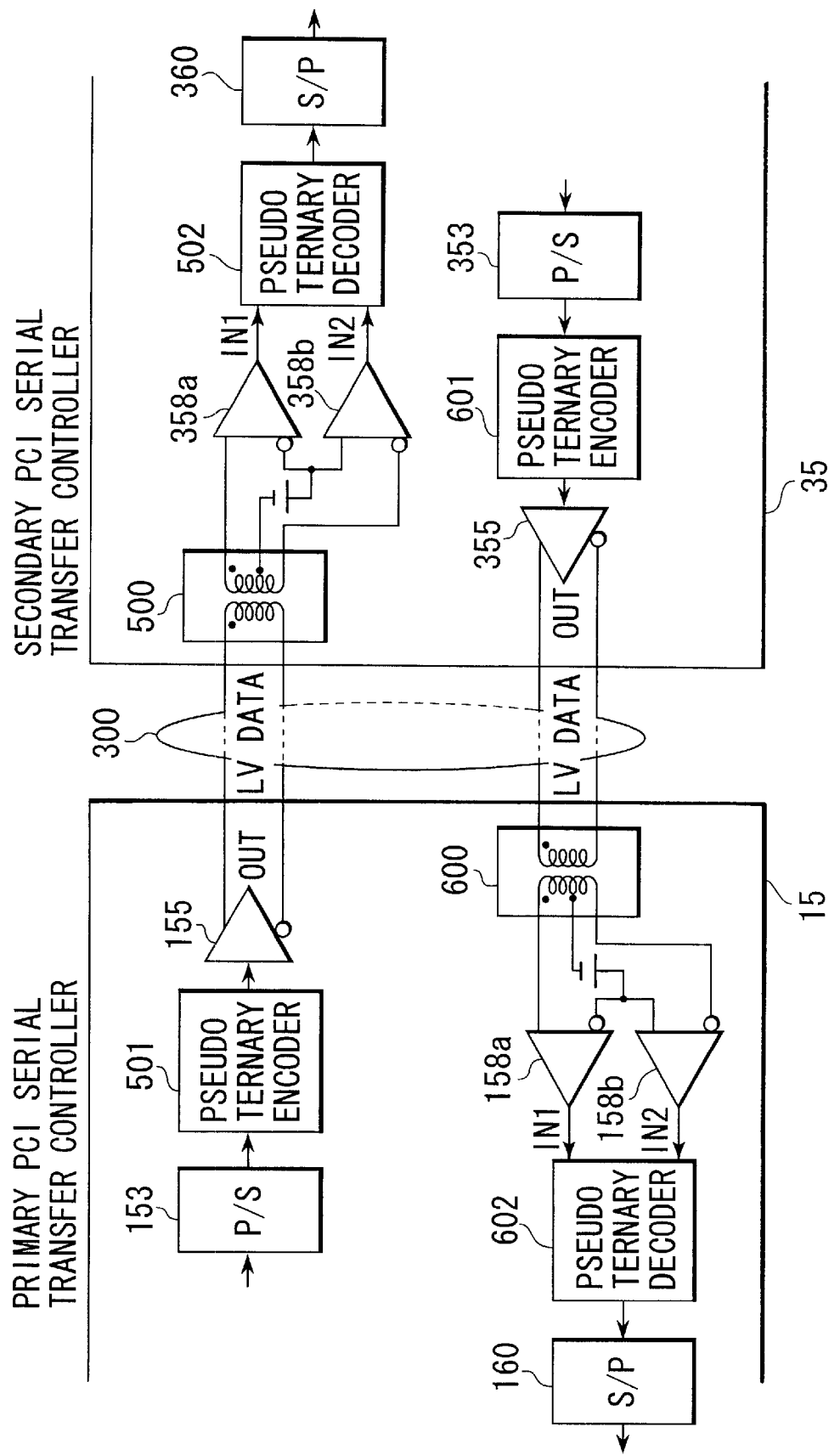
FIG. 5 is a block diagram for explaining a serial transfer scheme used in this embodiment.

FIG. 5 shows a hardware arrangement used when transformers are inserted in serial transmission paths constituted by differential signal line pairs, and the serial transmission paths are driven by a pseudo ternary scheme. Only the arrangement of a portion corresponding to the differential signal line pairs (LV DATA) for data transmission will be described below. However, a similar arrangement can be applied to the differential signal line pairs (LV CLK) for clock transmission.

As shown in FIG. 5, a transformer (pulse transformer) 500 is inserted in the downward differential signal line pair (LV DATA) from the PCI serial transfer controller 15 to the PCI serial transfer controller 35. Since the serial transfer path 300 is constituted by cables, the transformer 500 is actually implemented in the secondary PCI serial transfer controller 35 as the receiving side of serial transfer through the downward differential signal line pair (LV DATA), as shown in FIG. 5. The transformer 500 cuts DC components of signal and transfers only AC components. By inserting the transformer 500, therefore, noise resistance to common mode noise such as static electricity can be improved. Consideration must be given to the following points when the transformer 500 is inserted:

1) To prevent a transformer from being saturated or excited, a current must be prevented from continuously flowing in one direction.
2) The amounts in which voltages applied to the transformer in the positive and negative directions are averaged. If the amount in which a voltage is generated in one direction is large, a voltage waveform generated on the secondary side of the transformer shifts in voltage level as a whole, although the voltage amplitude remains unchanged.

In this embodiment, therefore, in the primary PCI serial transfer controller 15, a pseudo ternary encoder 501 is interposed between a parallel/serial conversion circuit 153 and a differential output buffer 155. The pseudo ternary encoder 501 is a modulation circuit for converting binary data of "1" and "0" constituting serial data into ternary values, i.e., +, −V, and zero. More specifically, every time binary data change in value, +V and −V are alternately output from the differential output buffer 155. When binary data with the same value continue, zero is output from the differential output buffer 155. Alternatively, zero may be output when the value of binary data is "0", and +V and −V may be alternately output when the value is "1".

In the "+V"-output state, the signal line connected to the positive output terminal of the differential output buffer 155 is set at a positive potential, and the signal line connected to the negative output terminal of differential output buffer 155 is set at a negative potential. In this case, a current flows in the transformer 500 in the downward positive direction in FIG. 5.

In the "−V"-output state, the signal line connected to the positive output terminal of the differential output buffer 155 is set at a negative potential, and the signal line connected to the negative output terminal of differential output buffer 155 is set at a positive potential. In this case, a current flows in the transformer 500 in the upward negative direction in FIG. 5.

In the "zero"-output state, the signal lines connected to the positive and negative output terminals of the differential output buffer 155 become at the same potential, and no current flows in the transformer 500.

In the secondary PCI serial transfer controller 35, as shown in FIG. 5, two differential input buffers 358a and 358b are provided in parallel on the secondary side of the transformer 500. The two differential input buffers 358a and 358b can detect ternary values, i.e., +V, −V, and zero.

FIG. 6 shows the relationship between outputs (OUT) from the differential output buffer 155 and values (IN1, IN2) detected by the differential input buffers 358a and 358b. OUT indicates an electrical state, and IN1 and IN2 represent logical values.

If OUT is +V, both the differential input buffers 358a and 358b output "1" (IN1, IN2="1"). If OUT is −V, both the differential input buffers 358a and 358b output "0" (IN1, IN2="0"). If OUT is zero, the differential input buffer 358a outputs "0", and the differential input buffer 358b outputs "1" (IN1 ="0", IN2="1"). The logical values of IN1 and IN2 are decoded back to the binary data by a pseudo ternary decoder 502. A decoding method is determined in accordance with the encoding method used by the pseudo ternary encoder 501.

A transformer (pulse transformer) 600 is inserted in the upward differential signal line pair (LV DATA) from the PCI serial transfer controller 35 to the PCI serial transfer controller 15. As in the case of the downward differential signal line pair, a pseudo ternary encoder 601 is interposed between the parallel/serial conversion circuit 353 and the differential output buffer 355 on the secondary PCI serial transfer controller 35 side. In addition, on the primary PCI serial transfer controller 15 side, two differential input buffers 158a and 158b and a pseudo ternary decoder 602 are interposed between the transformer 600 and the serial/parallel conversion circuit 160.

By performing serial transfer using this pseudo ternary scheme, a satisfactory DC balance can be ensured. This makes it possible to solve the problems of magnetic saturation of the transformer and a shift in the offset level of a signal on the secondary side of the transformer.

Serial Transfer Scheme 2

Figure 7:
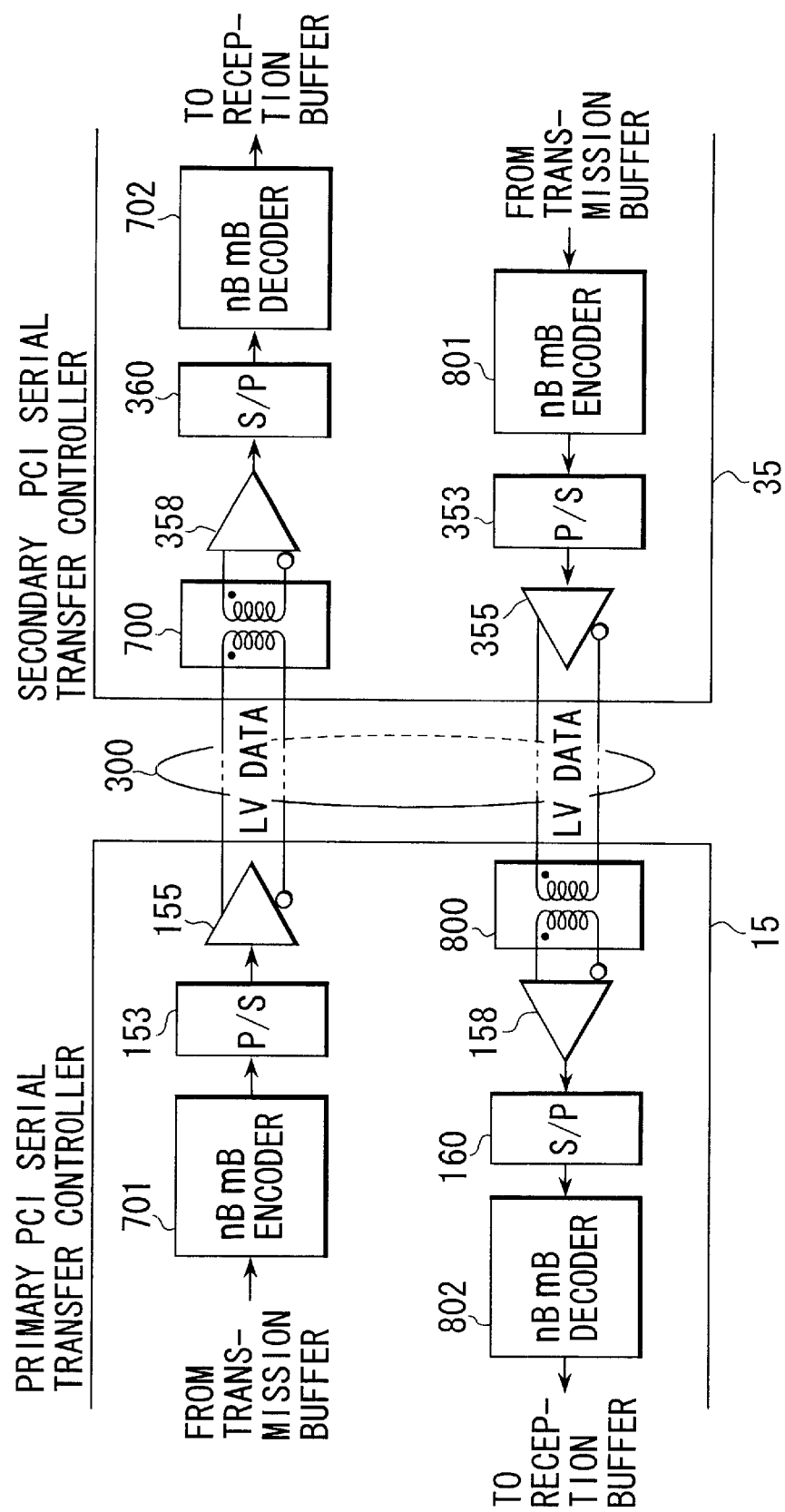
FIG. 7 is a block diagram for explaining the second example of the serial transfer scheme used in this embodiment.

FIG. 7 shows an arrangement using an nBmB scheme of transmitting information required for transaction transfer by encoding the information into m-bit (m>n) code sequences in units of n-bit information words instead of using the pseudo ternary scheme.

As shown in FIG. 7, a transformer (pulse transformer) 700 is inserted in the downward differential signal line pair (LV DATA) from the PCI serial transfer controller 15 to the PCI serial transfer controller 35. Since the serial transfer path 300 is constituted by cables, the transformer 700 is implemented in the secondary PCI serial transfer controller 35 serving as the receiving side, as in the case shown in FIG. 5.

In the primary PCI serial transfer controller 15, an nBmB encoder 701 is connected to the input of the parallel/serial conversion circuit 153. In the secondary PCI serial transfer controller 35, an nBmB decoder 702 is connected to the output of the serial/parallel conversion circuit 360.

The nBmB encoder 701 converts an n-bit information word consisting of (n−1)-bit information and a 1-bit parity into an m-bit code sequence. This conversion is implemented by assigning each of 512 data represented by n-bit data to a corresponding one of 512 data preselected from 1,024 data represented by m-bit code sequences. More specifically, as shown in FIG. 8A, the conversion may be performed by using, for example, a table for outputting m-bit data in accordance with an n-bit input value. A satisfactory DC balance can be ensured by using only data, of the 1,024 data represented by m-bit code sequences, in which the ratios for the numbers of "1s" to the numbers of "0s" are almost equal. The m-bit code sequences serially transferred are decoded back the original n-bit information words by the nBmB decoder 702 in FIG. 8B.

A transformer (pulse transformer) 800 is inserted in the upward differential signal line pair (LV DATA) from the PCI serial transfer controller 35 to the PCI serial transfer controller 15. As in the case of the downward differential signal line pair, a nBmB encoder 801 is provided on the secondary PCI serial transfer controller 35 side, and a nBmB decoder 802 is provided on the primary PCI serial transfer controller 15 side.

An 8B10B encoder and 8B10B decoder may be used as an nBmB encoder and an nBmB decoder respectively. Applications The abovementioned PCI serial interface mechanism of this embodiment can be used for bus connection between two docking stations as well as bus connection between the PC body 100 and the docking station 200. If, for example, two docking stations can be cascaded to the PC body 100, this mechanism can be used for bus connection between the first docking station and the second docking station. In addition, if two PC bodies are connected through a bus, the PCs can share resources without the mediacy of a network such as a LAN. In either case, since a serial transmission path can be realized by a cable, the functions can be easily expanded.

In this embodiment, the upward and downward transmission paths are symmetrical (identical). Depending on the system design, however, two transmission paths may preferably differ in synchronization/asynchronization, the data widths of the buses, bus protocols, electrical interfaces, and the like.

In this embodiment, serial transmission path is realized as a cable. However, serial transmission path may be realized by various forms, e.g., connectors, a wiring pattern on a substrate, radio waves, infrared rays, ultrasonic waves, and electric wirings inside LSIs.

As has been described above, according to the present invention, a computer body and an expansion unit can be connected to each other through a cable with less signal lines, and any unnecessary resources need not be assigned to the cable, thereby realizing a computer system that is excellent in functional expandability and flexibility of the housing structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
    first and second buses respectively constituted by multiple-bit-width parallel transmission paths;
    a first controller connected to said first bus;
    a second controller connected to said second bus; and
    a serial transmission path interposed between said first and second controllers,
        wherein said first and second controllers exchange a command, address, and data of a transaction from one of said first and second buses to the other bus through said serial transmission path, each of said first and second controllers comprising;

a bus interface means which operates in synchronous with the same first clock signal as that used by a device on a corresponding one of the first and second buses to exchange a transaction with the corresponding bus, and serial transfer means that operates in synchronous with a second clock signal asynchronous to the first clock signal so as to execute serial transfer through the serial transmission path.

2. A computer system according to claim 1, wherein said first and second controllers logically constitute one unit.

3. A computer system according to claim 1, wherein said serial transmission path includes a plurality of serial transmission path.

4. A system according to claim 1, wherein said first and second controllers share a configuration address space assigned by one IDSEL signal.

5. A system according to claim 1, wherein said first controller has a first configuration register indicating an operation environment, said second controller has a second configuration register indicating an operation environment, and identical pieces of environmental setting information are respectively set in the first and second configuration registers.

6. A system according to claim 5, wherein identical pieces of environmental setting information are respectively set in the first and second configuration registers by copying the environmental setting information in the first configuration register to the second configuration register.

7. A system according to claim 1, wherein the serial transmission path includes at least one differential signal line pair.

8. A system according to claim 7, wherein each of said first and second controllers comprises:

means for encoding information required for transfer from a corresponding one of said first and second buses to the other bus into m-bit (m>n) code sequences in units of m-bit information words, and means for converting the m-bit (m>n) code sequence into serial data and outputting the serial data to the differential signal line pair.

9. A system according to claim 8, wherein said encoding means encodes information words into code sequences with the ratios for the numbers of 1s to the numbers of 0s are substantially equal.

10. A system according to claim 8, wherein each of said first and second controllers comprises:

means for receiving serial data output to the differential signal line pair and decoding an m-bit (m>n) code sequence into an n-bit information word, and means for converting the decoded n-bit information word into parallel data to be output to said first or second bus.

11. A system according to claim 1, wherein the serial transmission path includes at least one differential signal line pair, and a transformer is inserted in each differential signal line pair.

12. A system according to claim 11, wherein each of said first and second controllers comprises:

means for converting information required for transfer from a corresponding one of said first and second buses to the other bus, from parallel data into serial data, and means for converting each binary data constituting the serial data into ternary data including a first state in which a current flows in said transformer in a positive direction, a second state in which a current flows in said transformer in a negative direction, and a third state in which no current flows in said transformer, and outputting the ternary data to the differential signal line pair.

13. A system according to claim 12, wherein said each of said first and second controllers comprises:

means for detecting ternary data on the differential signal line pair and converting the detected ternary data into binary data, and means for converting serial data constituted by the converted binary data into parallel data to be output to said first or second bus.

14. A computer system comprising:

first and second buses respectively constituted by multiple-bit-width parallel transmission paths;

a first controller connected to said first bus;

a second controller connected to said second bus;

a serial transmission path interposed between said first and second controllers, wherein said first and second controllers exchange a command, address, and data of a transaction from one of said first and second buses to the other bus through said serial transmission path;

wherein said first controller comprises first bus interface means for exchanging a transaction with the first bus;

wherein said second controller comprises second bus interface means for exchanging a transaction with the second bus; and wherein said first and second bus interface means operate in synchronous with the first and second clock signals respectively which are asynchronous to each other.

15. A computer system according to claim 14, wherein said first and second controllers logically constitute one unit.

16. A computer system comprising:

first and second buses respectively constitute by multiple-bit-width parallel transmission paths;

a first controller connected to said first bus;

a second controller connected to said second bus;

a serial transmission path interposed between said first and second controllers, wherein said first and second controllers exchange a command, address, and data of a transaction from one of said first and second buses to the other bus through said serial transmission path;

wherein the serial transmission path comprises a full duplex channel including at least one pair of unidirectional serial transmission paths whose signal transmission directions are opposite to each other; and wherein each of the unidirectional serial transmission paths includes a serial data line for serially transferring the command, address, and data, and a clock signal line for transferring corresponding clock signals.

17. A computer system according to claim 16, wherein said first and second controller logically constitute one unit.

* * * * *

UNITED STATES PATENT AND TRADEMARK OFFICE
CERTIFICATE OF CORRECTION

PATENT NO.    : 6,606,678 B1
DATED         : August 12, 2003
INVENTOR(S)   : Nakamura It is certified that error appears in the above-identified patent and that said Letters Patent is hereby corrected as shown below:

Column 17,
Line 38, change "m-bit information" to -- n-bit information --.

Column 18,
Line 41, change "constitute" to -- constituted --.
Line 62, change "controller" to -- controllers --.

Signed and Sealed this

Second Day of December, 2003

JAMES E. ROGAN
*Director of the United States Patent and Trademark Office*